ABSTRACT

United States Patent
Brain

Figure 1:
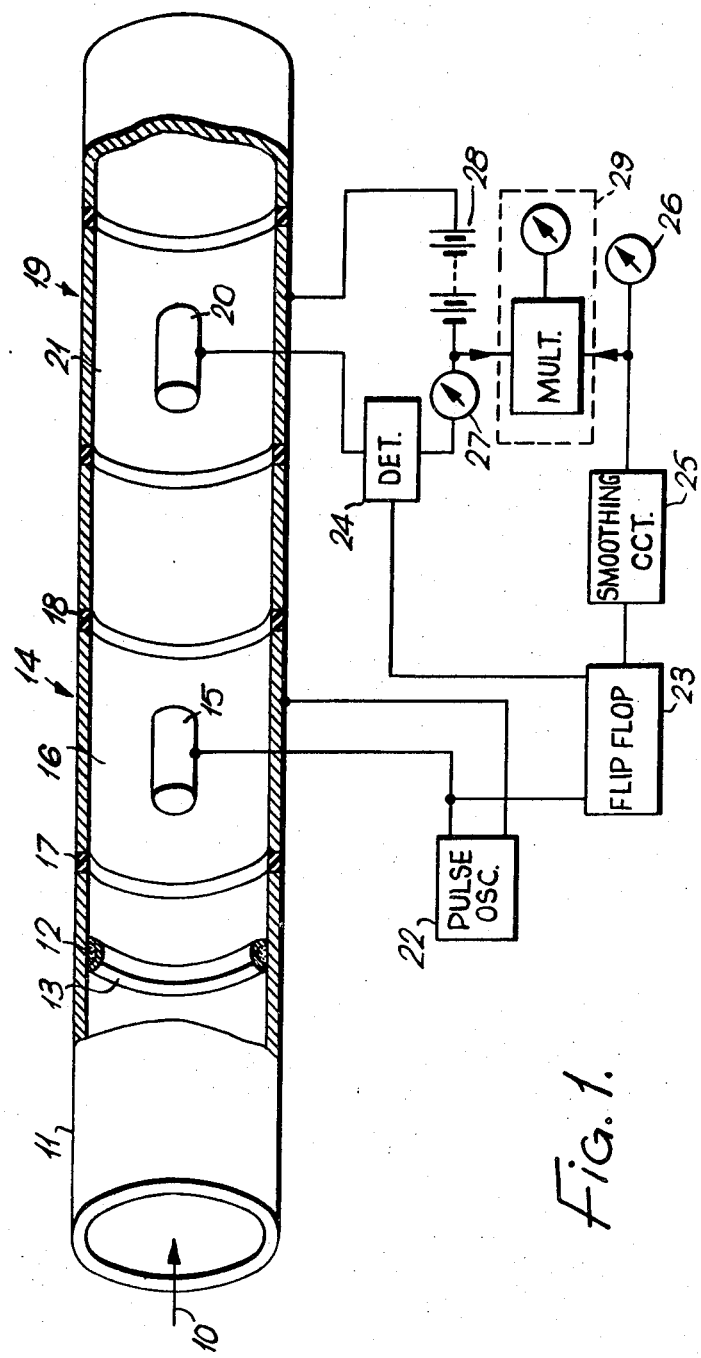

[15] 3,688,106
[45] Aug. 29, 1972

[54] MEASURING THE DENSITY, VELOCITY AND MASS FLOW OF GASES

[72] Inventor: Thomas John Stirrat Brain, Hamilton, Scotland

[73] Assignee: National Research Development Corporation, London, England

[22] Filed: March 23, 1970

[21] Appl. No.: 21,940

[30] Foreign Application Priority Data

March 28, 1969 Great Britain..........16,537/69

[52] U.S. Cl. .............250/43.5 FC, 73/194 F, 250/44
[51] Int. Cl. ............................................G01n 23/12
[58] Field of Search .........250/43.5 FC, 44; 73/194 F

[56] References Cited

UNITED STATES PATENTS

| 2,632,326 | 3/1953 | Stuart..............250/43.5 FC X |
| 2,861,452 | 11/1958 | Morgan............250/43.5 FC X |
| 2,569,974 | 10/1951 | Campbell........250/43.5 FC X |
| 2,637,208 | 5/1953 | Mellen............250/43.5 FC X |

OTHER PUBLICATIONS

Peycelon et al., S.N. 376,930, Published by Alien Property Custodian, May 25, 1943.

*Primary Examiner*—Archie R. Borchelt
*Attorney*—Cushman, Darby & Cushman

[57] ABSTRACT

A meter and a method of measuring the velocity of gas in a duct are described, and gas density and mass flow may also be measured. In one form the meter has an ion source and two ion collectors, so that gas in the duct is first ionized and then passes the collectors. The source and the collectors are devised to present little or no impedance to gas flow. A voltage pulse is applied to the first collector and the interval between this pulse and the resulting effect in the number of ions collected at the second collector is measured to give gas velocity. Density measurement is by determining the number of ions collected between pulses at the second collector, and mass flow is obtained by forming the product of velocity and density.

17 Claims, 2 Drawing Figures

MEASURING THE DENSITY, VELOCITY AND MASS FLOW OF GASES

The present invention relates to methods and apparatus for measuring the velocity of gases in a duct. In addition the density and/or mass flow of the gases may also be measured.

A known gas velocity meter employs an ionizing source between two spaced ion collectors. The ratio of the ions collected by the collectors is then an indication of the velocity of the gas. However this known meter is affected by variations in the ion recombination constant and is only suitable for the measurement of high gas velocities.

According to a first aspect of the present invention there is provided a meter for measuring the velocity of gases, including ionizing means for ionizing at least a part of a gas flowing along a duct, first and second electrode means, for collecting ions, spaced apart in the duct, means for effecting a change in the number of ions collected by the first electrode means, and means for measuring the interval between the time at which a change in the number of ions collected by the first electrode means is effected and the time at which a resultant change occurs in the number of ions collected at the second means, the meter being such that the velocity of gas flowing in the duct depends on the said interval.

According to a second aspect of the present invention there is provided a method of measuring the velocity of gases including ionizing at least a part of a gas flowing along a duct, effecting a change in the number of ions collected at a first point in the duct, collecting ions which pass the first point at a second point in the duct and measuring the interval between the time at which the change in the number of ions collected at the first point is effected, and the time at which a resultant change occurs in the number of ions collected at the second point.

The meter and method according to the invention do not suffer from the above mentioned disadvantages of the known meter since transit time is not affected by the ion recombination constant and relatively low as well as high gas velocities can be measured.

In the meter according to the first aspect of the invention the ionizing means preferably includes the isotope Americium–241 (alph emitting) or the isotope mixture Strontium–90/Yt trium–90 (beta-emitting).

These isotopes may be placed in a sealed thin metal foil located around the inner surface of the duct.

The first and second electrode means may each comprise two electrodes, the first electrode being a rod positioned downstream from the ionization means, at the center of the duct, and the second electrode being an insulated metal section of the duct. The means for effecting a change in the number of ions collected by the first electrode means may be a pulse source adapted to apply a square-wave voltage between the electrodes of the first electrode means.

The means for measuring the interval may include a flip-flop circuit connected to be triggered to a first state when a voltage pulse is applied to the first electrode means. The flip-flop circuit is triggered to its second state when a change in the number of ions collected by the second means is detected. The output of the flip-flop circuit is then a pulse train whose mark/space ratio depends on the gas velocity. The output circuit of the flip-flop may be connected to a volt meter by way of a smoothing circuit, so that the voltage indicated is a measure of gas velocity.

The meter for measuring gas velocity has many desirable features: since it presents little or no obstruction to gas flow, there will be only a negligible head loss across it. The meter is easy to install and no sealing problems are encountered. Since there are no moving parts the meter will not wear out, and there is no need to convert a mechanical signal to an electrical signal. Calibration of the meter is linear.

The meter according to the invention may also be used to measure the density of gas flowing in the duct by the addition of bias means for applying a unidirectional voltage between the first and second electrodes of one of the electrode means, and means for providing a signal indicative of the number of ions collected by the said one electrode means in the absence of a voltage from the pulse source, for example between pulses. The means for indicating the number of ions collected may be an ammeter connected in series with a direct-current source.

A versatile mass-flow meter can be provided by adding means for providing a signal indicative of the number of ions collected by the second means, and means for multiplying the said signal by the output of the means for measuring the interval. For example, the voltage obtained from the above mentioned smoothing circuit may be multiplied by the current flowing through the above mentioned d.c. source using a Watt meter or an equivalent circuit. The pulse rate of the pulse source should be such that the number of ions collected at the second means in between pulses correctly indicates the density of the gas flowing in the pipe.

The above specified mass flow meter has the advantages already listed for the velocity meter but in addition flow rate integration can readily be achieved to give the total gas flow. The flow meter will give part response to changes in gas flow, and it can, of course, be used as a velocity meter or a density meter.

Figure 2:
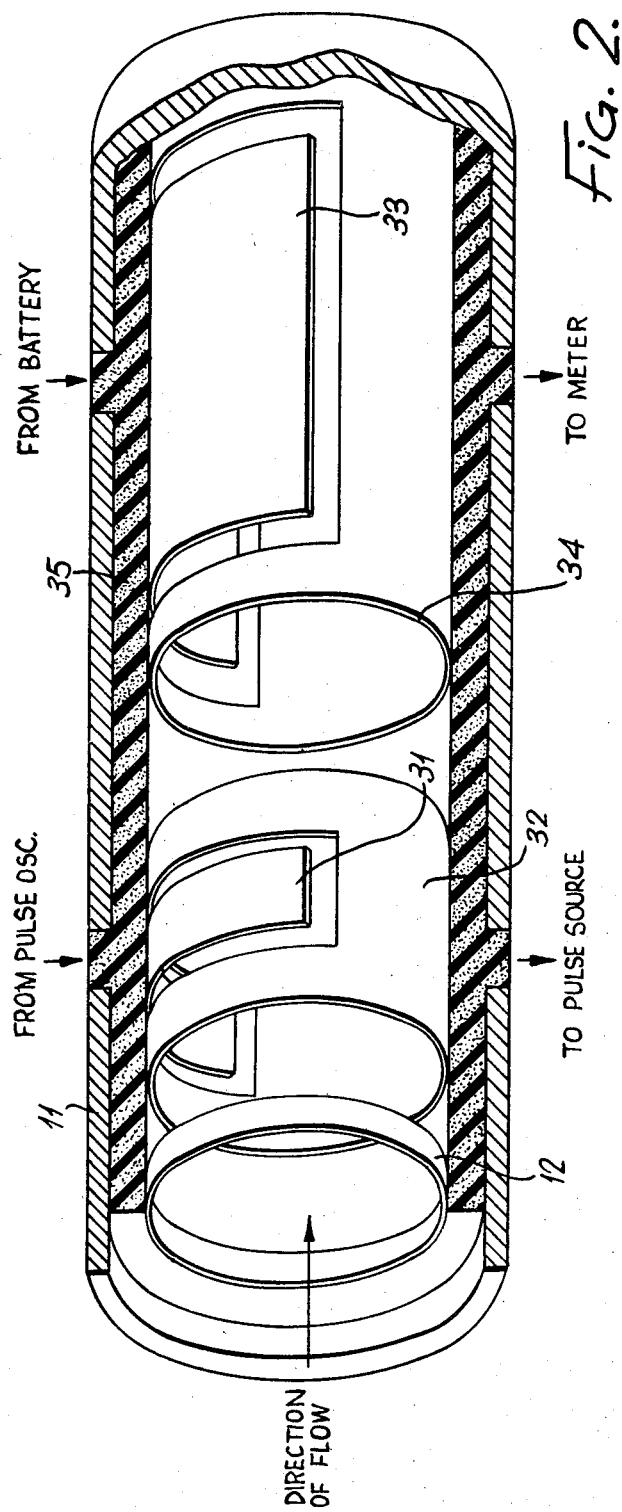

Certain embodiments of the invention will now be described, by way of example, with reference to the accompanying drawings, in which:

FIG. 1 is a part-schematic part-block diagram of one embodiment of a mass flow-meter according to the invention, and FIG. 2 is a schematic drawing of an electrode arrangement which may be used instead of the arrangement shown in FIG. 1.

In FIG. 1 gas passes in the direction of an arrow 10 along a pipe 11. The gas is first ionized by radioactive powder 12 sealed within a thin metal foil 13 located around the inner circumference of the pipe. As has been mentioned, the powder may contain the radioactive isotope Americium–241 (alpha emitting) or the isotope mixture Strontium–90/Yttrium–90 (beta emitting).

After being ionized the gas passes to an ion collection section 14 of the pipe 11 comprising two electrodes; firstly a cylindrical rod electrode 15 located at the center of the pipe co-axial therewith, and secondly an electrode 16 which is a section of the pipe wall insulated from the remainder of the pipe by insulating sections 17 and 18.

Gas then passes to a second ion-collection section 19 of the same form as the first such section. This second section has a cylindrical center electrode 20 and a wall-section electrode 21 insulated from the remainder of the pipe.

The electrodes 15 and 20 are supported by brass rods (not shown) within, and radial to, the pipe 11. The rods are fixed to, but insulated from, the electrodes 16 and 21, and provide a means for making connections to the electrodes 15 and 20.

A square-wave voltage from a pulse oscillator 22 having a repetition frequency of approximately 100 c/s is applied between the electrodes 15 and 16. The effect is that for the duration of each voltage pulse a number of ions are collected in the section 14, and in the intervals between pulses when zero voltage is applied between the electrodes 15 and 16, no ions are collected in this section. The interval between the leading edge of pulses from the oscillator 22 and the corresponding fall in the number of ions collected at the electrode 20 depends on the velocity of the gas in the pipe. Each time the leading edge of a pulse from the oscillator occurs, a flip-flop circuit 23 is set to a particular one of its two states, the flip-flop circuit being reset by a signal from a detector circuit 24 when a decrease in the number of ions collected at the electrode 20 is detected. Thus the interval for which the flip-flop circuit 23 is in its said one state depends on the velocity of the gas. The pulse output from the flip-flop circuit 23 is passed to a smoothing circuit 25 whose output is connected to a d.c. volt meter 26 which indicates the velocity of gas flow directly.

The electrode 20 is connected in series with a direct current meter 27 and a battery 28 which applies a unidirectional voltage of about 120 volts between the electrodes 20 and 21.

The detector 24 may include a resistor (not shown) in series with the battery 28, and a trigger circuit (not shown) responsive to changes in voltage across the resistor. Hence when the current in the resistor due to the collection of ions changes, the trigger circuit changes the state of the flip-flop circuit 23.

The number of ions arriving at the electrode 20 is found by measuring the battery current and is dependent on the total strength of the source and the ionization cross-section of the gas which are fixed for a given meter and gas. The number is also generally dependent on the gas velocity and density at the ionizing section but for a particular source strength, over a given velocity range, the ion collection current, as indicated by the meter 27, is independent of velocity and for a gas of constant composition it may be shown that in the intervals when no ions are collected at section 14 and all the ions arriving at section 19 are collected, the ion collection current, $$I = A\, Jf\, \rho/\rho_a\, e$$

where $A$ = cross-sectional area of the pipe
$J$ = ionizing power of the source
$f$ = the ionization cross-section of the gas
$\rho$ = the density of the gas at ionizing point
$\rho_a$ = the density of the gas at S.T.P.
$I$ = the collector current
$e$ = the charge on an electron
therefore $I = K\rho$ where $K$ is a constant.

The ionizing power, $J$, is a factor depending on the source strength. The ionization cross-section of the gas, $f$, gives a measure of the ability of the gas to be ionized. The product $Jf$ is the number of ion pairs per unit volume of gas produced when the gas is moving at unit velocity at S.T.P. conditions. Thus ionization current as indicated by the meter 27 gives a measure of the gas density ($\rho$) in the pipe adjacent to the ionizing source.

For accurate measurement of gas density, the composition of the gas should be constant, dust content should be low, and temperature variations between the sections 14 and 19 should be small.

The accuracy of density measurement required, determines the velocity range in which density measurement can be carried out. For example the error in density measurement will be $\leq 0.01$ per cent if $$\lambda Jf\sigma L \leq 10^{-4}\mu^2$$

where $\sigma = \rho/\rho_a$
$\lambda$ = the ion recombination coefficient,
$\mu$ = the velocity of the gas at the ionizing section, and
$L$ = the distance between the ionizing source and the second ion-collection section.

The voltage from the smoothing circuit 25 and the current in the meter 27 are applied to a circuit 29 which multiplies the average value of the current by the value of the voltage to give a product which is proportional to the mass flow of gas in the pipe. The circuit 29 may be a Watt meter. The current flowing in the meter 27 will be a pulse current, but provided the response time of this meter and that of the circuit 29 is low compared with the frequency of the pulse oscillator 22, steady accurate output readings will be obtained.

The electrodes of FIG. 1 may be replaced by the electrode arrangement of FIG. 2 which has the advantage that there is no obstruction to gas flow.

The electrodes 15 and 16 are replaced by sheet metal electrodes 31 and 32 respectively. Similar but rather larger sheet metal electrodes 33 and 34 replace the electrodes 20 and 21. The radioactive source 12 is constructed as in FIG. 1, and the electrodes and the source are contained in an insulating tube 35 which lines the pipe 11. The electrodes 31 and 32 are connected to the "live" and the earth side of the pulse oscillator 22, respectively, the electrode 33 is connected to the high voltage terminal of the battery 28, and the electrode 34 is connected to the direct current meter 27.

The configuration of the ion source and the electrodes need not be as described, and other circuits from that indicated by the block diagram may be used to evaluate density, velocity and mass flow.

I claim:

1. A meter for measuring the velocity of gases, including:

ionizing means for ionizing at least a part of a gas flowing along a duct, first and second electrode means, for collecting ions, spaced apart in the duct, means for effecting a change in the number of ions collected by the first electrode means, and means for measuring the interval between the time at which a change in the number of ions collected by the first electrode means is effected and the time at which a resultant change occurs in the number of ions collected at the second electrode means.

2. A meter according to claim 1 wherein the means for ionizing gas includes a radioactive source.

3. A meter according to claim 2 wherein the radioactive source includes an isotope chosen from the group including the isotope Americium-241 and the isotope mixture Strontium-90/Yttrium-90.

4. A meter according to claim 2 wherein the first and second electrode means each include a first electrode in the form of a rod positioned at the center of the duct, and a second electrode in the form of an insulated conductive portion of the duct, the rod being surrounded by, and co-axial with, the portion.

5. A meter according to claim 4 wherein the means for effecting a change in the number of ions collected by the first electrode means includes a pulse source adapted to supply a square wave voltage to the first electrode means.

6. A meter according to claim 5 including:
a direct current source for applying a bias voltage to one of the electrode means, and
means for providing a signal indicative of the number of ions collected by the electrode means to which the bias voltage is applied when the pulse source does not apply a voltage to the first electrode means, the meter being such that the said signal may indicate the density of gas in the duct.

7. A meter according to claim 6 including means for multiplying the output signal from the means for measuring the said interval by the signal indicative of the number of ions collected.

8. A meter for measuring the velocity of gases, including:
ionizing means for ionizing at least a part of a gas flowing along a duct,
first and second electrode means, for collecting ions, spaced apart in the duct,
means for effecting a change in the number of ions collected by the first electrode means, and
means for measuring the interval between the time at which a change in the number of ions collected by the first electrode means is effected and the time at which a resultant change occurs in the number of ions collected at the second means, wherein
said means for ionizing gas including a radioactive source, and
the first and second electrode means each include first and second electrodes each in the form of a sheet of conductive material adjacent to, but separated from, a portion of the duct wall, each sheet being shaped to conform to that portion of the wall to which it is adjacent.

9. A meter according to claim 8 wherein each second electrode has an aperture containing the first electrode.

10. A meter according to claim 8 wherein the means for effecting a change in the number of ions collected by the first electrode means includes a pulse source adapted to supply a square wave voltage to the first electrode means.

11. A meter according to claim 10 wherein the means for measuring the interval includes;
detector means for detecting changes in the number of ions collected by the second electrode means, and
a bistable circuit connected to means for determining the ratio of the intervals in which the bistable circuit is in first and second conduction states, the bistable circuit being connected to be triggered by the pulse source to take up a first conduction state when a voltage pulse is applied to the first electrode means and to be triggered by a detection means to take up a second conduction state when a change in the number of ions collected by the second electrode means is detected by the detection means.

12. A meter according to claim 11 wherein the means for determining the ratio of the intervals includes a volt meter connected to the bistable circuit by way of a smoothing circuit.

13. A meter according to claim 10 including:
a direct current source for applying a bias voltage to one of the electrode means, and
means for providing a signal indicative of the number of ions collected by the electrode means to which the bias voltage is applied when the pulse source does not apply a voltage to the first electrode means, the meter being such that the said signal may indicate the density of gas in the duct.

14. A meter according to claim 10 including:
a direct current source for applying a bias voltage to one of the electrode means,
means for providing a signal indicative of the number of ions collected by the electrode means to which the bias voltage is applied when the pulse source does not apply a voltage to the first electrode means, the meter being such that the said signal may indicate the density of gas in the duct, and wherein
the direct-current source is connected between the said first electrode and the said second electrode of that electrode means to which the bias voltage is to be applied.

15. A meter according to claim 10 including:
a direct current source for applying a bias voltage to one of the electrode means,
means for providing a signal indicative of the number of ions collected by the electrode means to which the bias voltage is applied when the pulse source does not apply a voltage to the first electrode means, the meter being such that the said signal may indicate the density of gas in the duct, and
means or multiplying the output signal from the means for measuring the said interval by the signal indicative of the number of ions collected.

16. A method of measuring the velocity of gases including:
ionizing at least a part of a gas flowing along a duct,
effecting a change in the number of ions collected at a first point in the duct,
collecting ions which pass the first point at a second point in the duct, and
measuring the interval between the time at which the change in the number of ions collected at the first point is effected, and the time at which a resultant change occurs in the number of ions collected at the second point.

17. A meter for measuring the velocity of gases, including:
ionizing means for ionizing at least a part of a gas flowing along a duct,
first and second electrode means, for collecting ions, spaced apart in the duct,
a pulse source means for supplying a square wave voltage to the first electrode means, and means for measuring the time interval between the time at which a change in the number of ions collected by the first electrode means occurs due to the square wave voltage and the time at which a resultant change occurs in the number of ions collected at the second electrode means.

* * * * *